G. H. ISLEY.
TALKING MACHINE.
APPLICATION FILED FEB. 16, 1918.
1,355,081.
Patented Oct. 5, 1920.
2 SHEETS—SHEET 1.
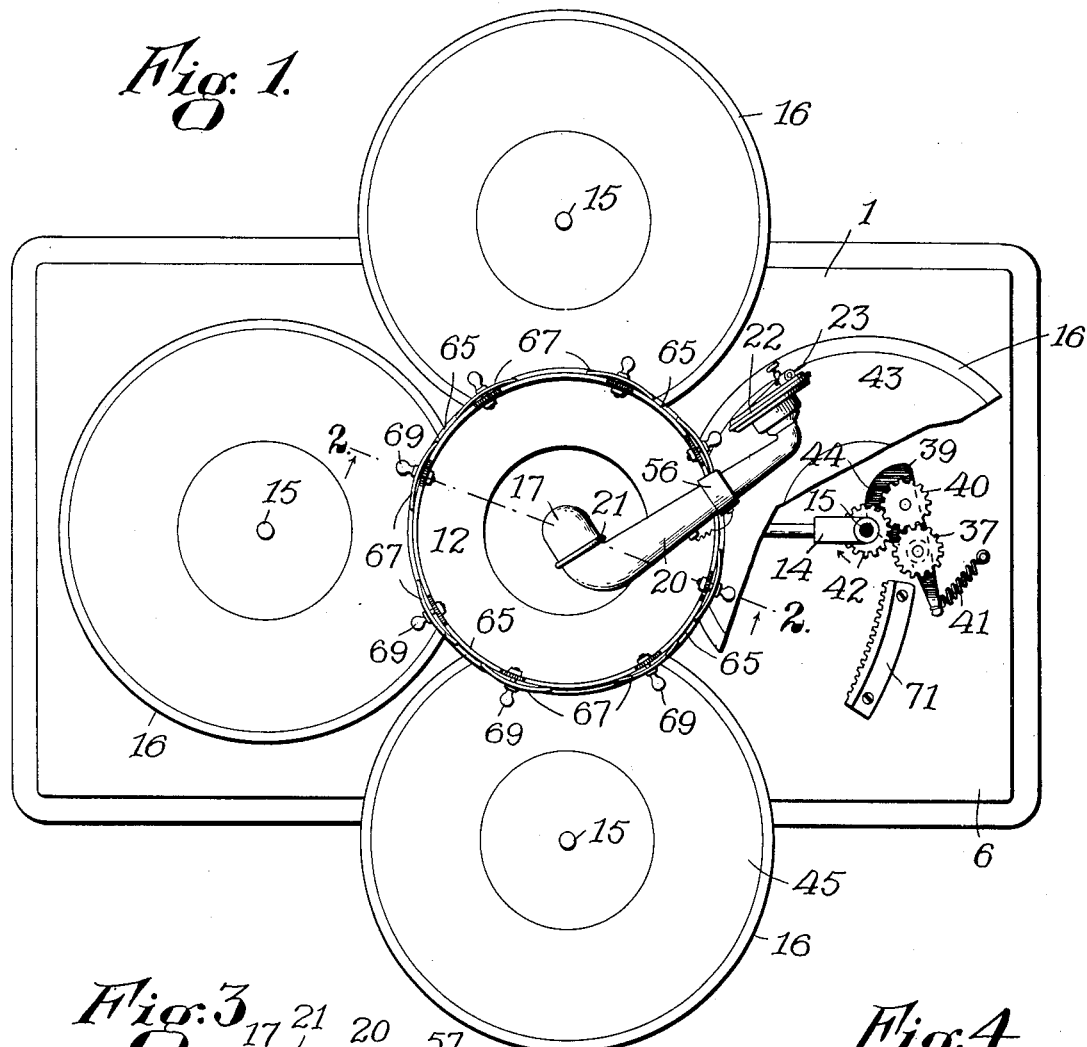
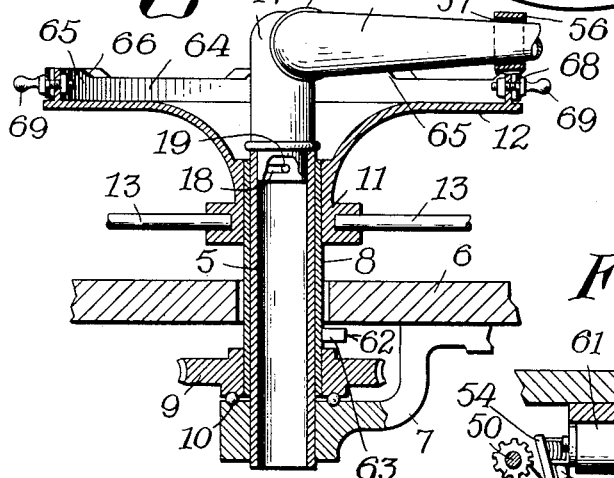
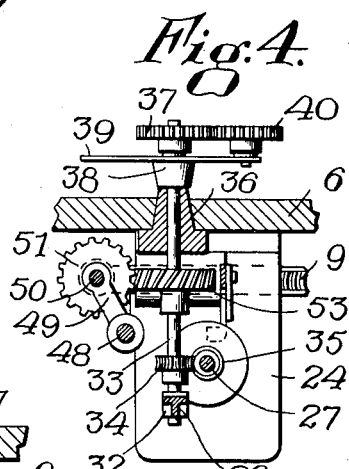
Inventor
G. H. Isley
By Attorneys
Fowler & Kenney G. H. ISLEY.
TALKING MACHINE.
APPLICATION FILED FEB. 16, 1918.
1,355,081.
Patented Oct. 5, 1920.
2 SHEETS—SHEET 2.
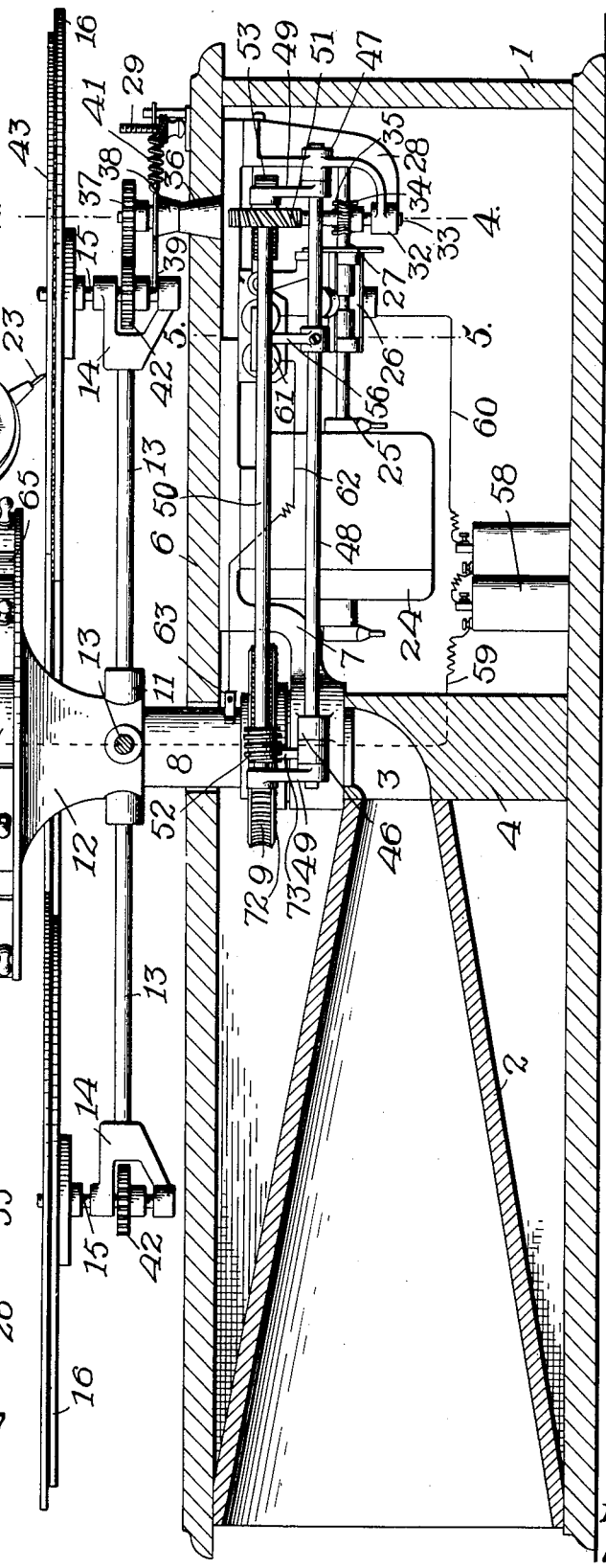
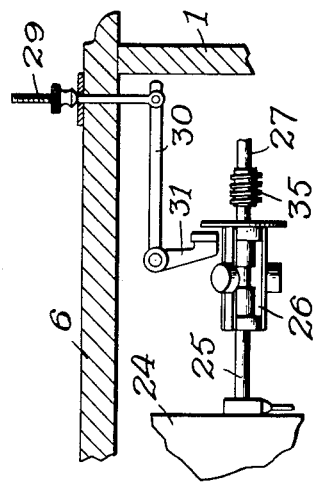
Inventor
G. H. Isley
By Attorneys
Fowler & Kenly

UNITED STATES PATENT OFFICE.

GEORGE H. ISLEY, OF WORCESTER, MASSACHUSETTS.

TALKING-MACHINE.

1,355,081.  Specification of Letters Patent.  Patented Oct. 5, 1920.

Application filed February 16, 1918. Serial No. 217,479.

*To all whom it may concern:*

Be it known that I, GEORGE H. ISLEY, a citizen of the United States, residing at Worcester, in the county of Worcester and Commonwealth of Massachusetts, have invented a new and useful Improvement in Talking-Machines, of which the following, together with the accompanying drawings, is a specification.

The present invention relates to talking machines, and more particularly to such machines which are adapted to play continuously, by the use of a multiplicity of records, the latter being brought progressively, by mechanical means, into position for playing by the tone producing mechanism of the machine. The invention of the present application resides in certain improvements and refinements upon a machine of similar type which is shown and described in my prior copending application Serial No. 108,342, filed July 10, 1916, all as set forth more fully in the following description and shown in the accompanying drawings, in which—

Figure 1 is a plan view of a machine embodying my present invention, certain parts being broken away to disclose more fully the construction.

Fig. 2 is a transverse sectional view thereof partly on the line 2—2 of Fig. 1, disclosing interiorly the operating mechanism of the machine.

Fig. 3 is a central sectional view of the tone arm support and associated parts.

Fig. 4 is a section on the line 4—4 of Fig. 2.

Fig. 5 is a section on the line 5—5, Fig. 2.

Fig. 6 is a fragmentary detail view showing the governing mechanism of the machine, and Fig. 7 is a fragmentary detail view showing a modified cam construction.

Like reference characters refer to like parts in the different figures.

As herein shown, the machine provides a stand or support, which is in the form of a hollow rectangular box 1, adapted to inclose the operating mechanism of the machine. The box 1 in the form shown also may be constructed to provide the usual horn or sound diffuser 2, in the present instance shown as an opening through one end of the box, with its smaller end connected to a curved sound passage 3 in a vertical partition 4 within the box.

The curved sound passage 3 opens upwardy through the top of partition 4, and registers with a sound tube 5, Fig. 3, which projects perpendicularly through the top or cover 6 of the box. The sound tube 5 is held stationary by a bracket 7, depending from the under side of cover 6, as shown in Fig. 3. Surrounding the sound tube 5 is a rotatable sleeve 8 having secured to its lower end a worm gear 9, which is rotatively supported from the bracket 7 by means of a thrust bearing 10. The sleeve 8 projects through cover 6 and has secured to its upper end the hub 11 of a circular plate or disk 12. Radiating from the hub 11 are a plurality of equidistant rods 13, 13, here shown as four in number, and each supporting, at its outer end, a bifurcated bracket 14 providing bearings for a vertical shaft 15. Each of the four shafts 15 supports on its upper end a record table 16 of ordinary construction, adapted for receiving thereon a disk record of the type in general use. It will thus be seen that provision is made for the rotative support of a plurality of radially disposed record tables about the axis constituted by the central sound tube, the entire thrust of the several tables and the records supported thereby be taken by the bearing 10.

The stationary sound tube 5 has connected to its upper end, in the usual manner, a hollow tone arm support 17, the latter being capable of limited rotative movement with respect to the sound tube by virtue of an elongated slot 18 therein, in which is received a pin 19 secured to the sound tube. The tone arm 20 of the machine is secured in the usual way to the tone arm support 17, that is, by a pivotal connection 21, which permits movement of the tone arm 20 about a substantially horizontal axis. The tone arm 20 is thus supported and disposed in the same manner as the tone arm of the single record machines now in ordinary use; the reproducing mechanism 22 and needle 23, all of ordinary construction and carried in the usual way by the free end of said tone arm, can swing back and forth in a horizontal plane as the needle traverses the groove of a record, due to the pin and slot connection 18, 19 between the tone arm support 17 and the stationary sound tube 5; also said reproducing mechanism and needle can be raised from and lowered onto a record, in the usual manner due to the pivotal connection 21 between the tone arm 20 and its support 17.

The bracket 7 on the opposite side of partition 4 from the horn 2 supports a driving motor for the machine, preferably an electric motor 24, although any desired kind of motor, such as a spring motor, may be used. The shaft 25 of motor 24 is connected through the usual centrifugal speed governing device 26, Fig. 6, with an alined shaft 27 supported in bearings in a depending stationary bracket 28. The speed regulating device 26 is operable in the usual manner in devices of this class to control and maintain constant, for any desired regulation, the speed of shaft 27, as by means of a manipulating screw 29 projecting upwardly through the cover 6 and connected by suitable linkage 30, 31 to the device 26, as shown in Fig. 6.

The bracket 28 provides a bearing 32 for the support of a vertical shaft 33, the latter having a worm gear 34 thereon in mesh with a worm 35 on the shaft 27. The upper end of shaft 33 projects through the cover 6, being suitably journaled in a bearing 36 provided by said cover, and on its upper end said shaft has secured a spur gear 37. The bearing 36 supports the hub 38 of a cam plate 39, which is loosely journaled to rock on the axis provided by said shaft. The plate 39 carries a gear 40 which is constantly in mesh with the gear 37, irrespective of the position of said plate. A spring 41 secured to the end of the plate 39 on the opposite side of its axis from the gear 40 tends yieldingly to urge the gear 40 inwardly of the machine, toward the center of rotation of the several record tables 16, for a purpose to be hereinafter described.

Each record table shaft 15 carries a spur gear 42, which is adapted to mesh with and be driven from the gear 40 whenever the record associated therewith is brought into position to be played by the reproducing mechanism 22. As shown in Fig. 1, one of the record tables 16 is in playing position beneath the reproducing mechanism 22, and the gear 42 of its shaft 15 is in mesh with gear 40, so as to be driven in a clockwise direction from the constantly rotating gear 37 during the playing of the record 43 on said table. The other three record tables 16 are stationary, the gears 42 of their respective shafts 15 being removed from operative connection with the driving motor. The spring 41 throws the free end of plate 39 inwardly, so as to hold the gear 40 in mesh with the gear 42, as shown in Fig. 1; it will be seen that irrespective of the position assumed by any particular gear 42 when it is brought to rest in the playing position for its associated record, the gear 40 will always accommodate itself about the shaft 33 so as to establish a driving connection with said gear 42. The inner edge of plate 39 is of rounded or cam formation, as shown at 44, and the curvature is such that it always makes contact with the shaft 15 of the record table which is in playing position and acts as a spacer to hold the axes of gears 40 and 42 the proper distance apart—i. e., in mesh on their pitch lines. When the centrally supported multiple record carrying structure is moved, as hereinafter described, to carry another record, say the record 45, into playing position, the pressure of shaft 15 against this curved edge 44 throws the gears 40 and 42 out of mesh and thus stops the rotation of the record 43 whose playing has been completed.

The mechanism for moving the rotatable multiple record carrying structure and for transferring the reproducing device 22 from a completed record to the next succeeding record about to be played will now be described in detail. The brackets 7 and 28 provide alined bearings 46 and 47 respectively for a rock shaft 48, the latter having secured thereto at opposite ends a pair of arms 49, 49. The free ends of arms 49, 49 have journaled therein a shaft 50, which carries near one end a spiral or beveled gear 51 and near the other end a worm 52. The gear 51 is adapted to be moved into and out of mesh with a similar gear 53 on vertical shaft 33, and simultaneously therewith the worm 52 is adapted to be moved into and out of mesh with the worm gear 9 on the lower end of sleeve 8. The movement of rock shaft 48, to accomplish this meshing and unmeshing of gears is effected by an arm 54 secured to said rock shaft and made responsive to the completion of the playing of a given record by the reproducing mechanism 22. That is, during the playing of a record by the machine, the rock shaft is so disposed as to hold the respective gears 51, 53 and 52, 9 out of mesh, and to this end a light spring 55 may be employed to yieldingly retain the shaft 50 in the position shown in Fig. 5. Upon the completion of the record, automatic means are operable on the arm 54 to draw the shaft 50 inwardly toward the gears 9 and 53, thereby establishing a driving connection between vertical shaft 33 and the sleeve 8, and causing rotation of the record carrying structure to move the completed record out of playing position and another record into playing position. Upon the movement of the new record into place, so that the gear 42 of its table 16 is in mesh with driving gear 40, the spring 55 must again become operative to draw back the shaft 50 and thus bring the rotatable record carrying structure to a standstill. The mechanism for accomplishing these functions is as follows:—

The tone arm 20 carries a metal collar 56, which is suitably insulated from the metal of the tone arm by a ring of insulating material 57, or by any other suitable means.

The collar 56 is electrically connected to a source of electrical supply, such as a battery or batteries 58, Fig. 1, by means of an insulated conductor which is indicated by the dotted lines 59, passing interiorly through the tone arm 20 and sound tube 5. It will be understood that electrical connection from the collar 56 to the source of current supply may be effected in other well known manner, the only requisite being that the means of connection be wholly insulated from the machine. The other terminal of battery 58 is connected by an electrical conductor 60 with an electromagnet 61, which is suitably secured to the bracket 7 in position to be operative upon the arm 54 of rock shaft 48. A return lead 62 from said electromagnet makes contact through brush 63 or the like with the sleeve 8, or with any part of the machine which is in electrical connection with the plate 12. Said plate 12 provides an annular rim 64, providing a plurality of equidistant raised portions 65, corresponding in number to the number of record tables 16. In the playing of a record, the collar 56 is held by the needle 23, above and out of contact with the rim 64 until said collar reaches one of the raised portions 65; the contact between the collar and the raised portion 65 completes the circuit through the electromagnet 61, and by the action of this electromagnet on the arm 54 draws the shaft 50 inwardly and, as above described, initiates the rotative bodily movement of the multiple record carrying structure, to bring another record into playing position.

This rotative bodily movement carries the record 43 out of playing position, moving it bodily in a counter-clockwise direction about the vertical axis of tone arm 20. Said tone arm swings with the record in the same direction through a limited arc, that is, until the pin 19 reaches the end of slot 18, whereupon horizontal motion of the tone arm ceases. The bodily rotative movement of the multiple record carrying structure being continued, provision must be made for lifting the tone arm so that the needle 23 will not scrape across the groove of record 43; this elevation of the tone arm is effected by the continuation of movement of the plate 12 itself, which causes the collar 56 to ride up an inclined surface provided on the advancing edge of each raised portion 65. As shown in Figs. 1, 2 and 3, these inclined surfaces, indicated at 66, are provided by plates 67 of the same height as portions 65 and forming, in effect, adjustable extensions of said raised portions to vary the effective length thereof. Each raised portion 65 is preferably provided with two such plates 67, one at each end thereof, said plates being short sections of curved spring metal of less radius of curvature than the rim 64, and held frictionally in place against the outer surface of said rim by pins or screws 68 passing through elongated slots in said rim. The plates 67 are retained under such compression by said pins or screws as will create a sufficient friction to retain them in any desired position, as will be readily understood; the effective length of any of the raised portions 65 can thus be varied at will simply by shifting said plates 67 by horizontal movement of the knobs 69 projecting from each pin or screw 68.

As shown in Fig. 7, this adjustment of the raised cam surfaces for coöperation with the collar 56 may be accomplished in a slightly different but equivalent manner, by providing a rim 64' having its outer surface slightly burred or roughened. In this modification one of the plates 67' of each pair is disposed on the inside of the rim, and each pin 68' passing through the corresponding slot of the rim has an inwardly directed projection 70 for coöperation with the burred outer surface. The compression of the plate 67' retains it frictionally in place; when it is desired to move the plate, the knob 69' of the pin must be pulled outwardly a little to disengage the projection 70 from the burred surface of the rim.

The general operation of the machine will be clear from the foregoing. It has been shown that upon the completion of a given record (or so much thereof as may have been previously determined upon by a setting of the cam plates 67), the bodily rotative movement of the multiple record carrying structure will be initiated, by the arrival of tone arm 20 in such a position as to complete the circuit through electromagnet 61. The tone arm, after partaking of this horizontal shifting movement for a predetermined distance, is brought to a stop, and the horizontal movement of the record continuing, said tone arm rides up the cam surface 66 to allow the record to pass unimpeded beneath the needle 23. This position to which the tone arm is returned, and where it stops, is the position for the commencement of the playing of the next record 45, which is being simultaneously carried into playing position as the record 43 is moved out of playing position. As soon as the record 45 reaches playing position, with the gear 42 of its table 16 in mesh with gear 40, the collar 56 will reach the end of raised portion 65 which has been holding the tone arm in elevated position, and said collar sliding gradually down the incline 66 at the rear end of said moving raised portion 65 will lower the needle 23 onto the outermost convolution of the groove of record 45. During this shifting of records, the gear 40 rotates continuously, and if the stationary gear 42 of record 45 is brought into mesh too suddenly, a strain is liable to be imposed on the mechanism. To prevent this a curved stationary rack 71 is supported on the cover 6 in position to be engaged by gear 42 as said gear is moved along by the bodily rotation of the record carrying support, toward its playing position. The engagement of gear 42 with rack 71 imparts an initial slow rotation to the record before it reaches playing position, so that the gears 40 and 42 mesh easily, and the inertia of the table 16 and record thereon is overcome; said record can therefore acquire its proper playing speed immediately it comes into playing position.

The arrival of a record into playing position, as above described, is coincident with the completion of the traverse of an adjustable raised rim portion 65 beneath the collar 56 of the tone arm; that is to say, each raised portion 65 is previously so adjusted by manipulation of its extension plates 67 with respect to its associated record, that the electrical connection between collar 56 and the rim 64 will be broken as soon as the outer convolution of the record groove reaches a point approximately beneath the needle 23. It will be understood that the adjustment provided by the extension plates 67 takes care of variations in the size of the records on the several tables 16; in other words, by a previous setting of these extension plates, each record, whatever its size, can be brought to rest with its outer groove in position to receive the needle or stylus just as the latter is lowered into place, and obviously, the intermediate gear 40, as above described, enables the rotation of vertical shaft 33 to be transmitted to record table shaft 15, irrespective of the position which the latter assumes, as determined by the size of the record on its table 16.

The stoppage of a given record in playing position, as determined by a previous setting of its corresponding cam plates 67, is accompanied by the outward rocking of shaft 50, since the flow of current through the electromagnet 61 is stopped. To insure the absolute stoppage and retention of a record in its playing position, and to prevent further movement of the rotative multiple record carrying support after this playing position has been reached, which might occur under its own momentum, a suitable friction stop is provided. As herein shown, the under side of worm gear 9 has a burred or roughened surface 72, with which coöperates a strip of spring steel 73, carried by the adjacent rocker arm 49 of shaft 48. When the shaft 50 is in its operative position, to cause rotation of the multiple record carrying structure, the strip 73 is out of contact with the surface 72. However, as soon as a record arrives in playing position, the movement of shaft 50 to disconnect the gear 9 from its driving power, causes the strip 73 to make contact with the surface 72, and thus imposes a positive check on any further rotation of the multiple record carrying structure under its own momentum, or any accidental displacement thereof in either direction.

The adjustment provided by the extension plates 67, as above described, adapts itself to any size of record, and further, affords a means of manipulation by which any record of the series contained on the tables 16 may be skipped or omitted. A particularly convenient arrangement of cam plate extensions for this purpose is shown in Fig. 7, where one plate 67 of each pair is on the outside of rim 64 and the other plate 67' is on the inside of rim 64. This arrangement enables the plates of each pair to be spread apart so as to overlap the adjacent plates of the pairs of plates on each side, thus making it possible to play a given record and then to skip all the remaining records until a given record is again in playing position. This arrangement eliminates the notches or V-shaped depressions which would occur in the continuous raised portion thus constituted by the plates if it were sought to accomplish the above described repetition of a given record by manipulation of extension plates arranged all on one side of rim 64. Such notches would be formed by the inclined surfaces 66 at the ends of the plates. The disposal of said plates on opposite sides of the rim 64 allows them to overlap, and thus to provide a continuous raised portion for the support of the tone arm.

I claim,

1. In a talking machine, the combination with a pivoted tone arm, of a plurality of record tables adapted for movement, successively, into operative relation to said tone arm, record driving mechanism for rotating each table when in operative relation to said tone arm, and means brought into operation by the completion of the playing of a record on one of said tables for transmitting the power of said record driving mechanism to move said tables.

2. In a talking machine, the combination with a reproducing device, of a movable multiple record carrying support, record driving mechanism adapted to rotate each record on said support when brought into position for playing by said reproducing device, and means operable by the movement of said reproducing device over a record for causing the movement of said support by said record driving mechanism.

3. In a talking machine, the combination with a reproducing device, of a multiple record carrying support rotatable about the pivot of said reproducing device, and a single actuating mechanism for the rotation of successive records on said support and for the rotation of said support between the periods of playing of said records by said reproducing mechanism.

4. In a talking machine, the combination with a pivoted tone arm, of a plurality of record carrying tables movable bodily about the pivot of said tone arm, an actuating mechanism for the rotation of successive tables presented in playing position to said tone arm, and means for automatically connecting said actuating mechanism to said tables, to shift the latter in unison, upon the completion of the playing operation of a record.

5. In a talking machine, the combination with a single reproducing device, of a plurality of record carrying tables, a single actuating mechanism for the rotation of records on successive tables, and electrically operated means for procuring the shifting movement of said tables by said actuating mechanism.

6. In a talking machine, the combination with a single reproducing device, of a plurality of record carrying tables, a single actuating mechanism for the rotation of records on successive tables, and means for procuring the shifting movement of said tables by said actuating mechanism in the periods between the playing of successive records by said reproducing device.

7. In a talking machine, a support for a plurality of records, a single actuating means for the rotation of successive records on said support, and means for procuring movement of said support by said actuating means to carry successive records into playing position.

8. In a talking machine, a rotatable support for a plurality of independently journaled records, a rotating shaft adapted for driving successive records on said support, and means for procuring the rotation of said support from said shaft.

9. In a talking machine, a rotatable support for a plurality of independently journaled records, a rotating shaft adapted for driving successive records on said support, a second shaft adapted to transmit rotation of said first shaft to said support, and normally held in inoperative position, and means operable automatically by the completion of the playing of a record for moving said second shaft into operative position.

10. In a talking machine, a rotatable support for a plurality of independently journaled records, a rotating shaft adapted for driving successive records on said support, a second shaft adapted to transmit rotation of said first shaft to said support, and normally held in inoperative position, and electrically operated means for moving said second shaft into operative position.

11. In a talking machine, a rotatable support for a plurality of records, means operable by the completion of the playing of a record on said support for procuring rotation of said support to carry another record into playing position, said means comprising a shaft adapted for movement into and out of operative relation to said support, and a braking means movable with said shaft, and operative on said support when said shaft is moved into inoperative position.

12. In a talking machine, a support for a plurality of records, means for procuring the movement of said support to dispose each record, successively, in playing position with its outer groove in a predetermined position, and means for procuring rotation of each record in playing position, irrespective of the position of its axis of rotation.

13. In a talking machine, a support for a plurality of records, means for moving said support, means for stopping said support to dispose each record, successively, irrespective of its size, with its outer groove in a predetermined position, and means for procuring rotation of each successive record in said predetermined position.

14. In a talking machine, means for succesively moving a series of records into position for playing, a gear associated with each of said records, and a driving gear adapted to mesh successively with each of said record gears, said driving gear being bodily movable to conform to the positions assumed by said record gears.

15. In a talking machine, a rotatable support for a plurality of independently journaled records, a rotating shaft for driving successive records on said support, and means bodily movable about said shaft as an axis for transmitting the rotation of said shaft to said records.

16. In a talking machine, a support for a plurality of record tables, a gear connected to each table, a rotating shaft, and a gear adapted for bodily movement about the axis of said shaft for transmitting the rotation of said shaft to successive record table gears.

17. In a talking machine, a support for a plurality of record tables, a gear connected to each table, a continuously rotating driving gear, and a transmission gear in constant mesh with said driving gear and movable about the axis thereof, for procuring rotation of said record table gears as the latter are successively brought into mesh therewith.

18. In a talking machine, a support for a plurality of record tables, a gear connected to each table, a single driving gear adapted to mesh successively with each of said record table gears upon the shifting of said support to bring said tables successively into playing position, and means for maintaining the mesh of said gears on the pitch lines thereof.

19. In a talking machine, a support for a plurality of record tables, a gear connected to each table, a single driving gear adapted to mesh successively with each of said record table gears upon the shifting of said support to bring said tables successively into playing position, and means engageable by the shaft of each record table gear for preventing the mesh of said gears inwardly of their pitch lines.

20. In a talking machine, a support for a plurality of record tables, a gear connected to each table, a single driving gear adapted to mesh successively with each of said record table gears upon the shifting of said support to bring said tables successively into playing position, and means for procuring the disengagement of said gears upon the commencement of movement of each record table out of playing position.

21. In a talking machine, the combination with a reproducing device adapted for the playing of a plurality of successively presented records, of means for procuring the transfer of said reproducing device from one record to another, comprising a pair of coöperating adjustable curved cam plates associated with each record for retaining said reproducing device out of contact with said record, during its shifting movement, said cam plates being held under tension in all positions of adjustment thereof.

GEORGE H. ISLEY.

Witnesses:
 JOHN CLAYTON,
 PHILIP S. HULT.